United States Patent [19]

Goudy, Jr. et al.

[11] Patent Number: 4,688,699

[45] Date of Patent: Aug. 25, 1987

[54] BACTERICIDAL MIXTURE CONTROL SYSTEM HAVING FLOW AND DISPENSE DURATION CONTROLS FOR RESPECTIVE SUBSTANCES

[75] Inventors: Paul R. Goudy, Jr., Bayside; James A. Medhurst, Sussex; Donn R. Dresselhuys, Shorewood, all of Wis.

[73] Assignee: Autotrol Corporation, Milwaukee, Wis.

[21] Appl. No.: 783,297

[22] Filed: Oct. 2, 1985

[51] Int. Cl.⁴ .............................................. B67D 5/14
[52] U.S. Cl. ...................................... 222/56; 222/63; 222/67; 222/642; 222/644; 222/133; 210/123; 210/138; 137/412; 221/15; 221/96
[58] Field of Search ............... 210/123, 138, 169, 754; 222/56, 63, 64, 67, 639, 643, 644, 133, 638, 640, 641, 129.3, 129.4, 642; 137/412, 624.11; 221/15, 96

[56] References Cited

U.S. PATENT DOCUMENTS

| | | | |
|---|---|---|---|
| 3,335,911 | 8/1967 | Stutz | 222/640 |
| 3,456,801 | 7/1969 | Bowles | 210/169 |
| 4,094,786 | 6/1978 | Bury | 210/138 X |
| 4,252,252 | 2/1981 | Gross et al. | 222/642 X |
| 4,481,590 | 11/1984 | Otten | 194/200 X |

*Primary Examiner*—Joseph J. Rolla
*Assistant Examiner*—Edward S. Ammeen
*Attorney, Agent, or Firm*—Quarles & Brady

[57] ABSTRACT

A mixture control system for mixing a bactericidal chemical and water in a reservoir in batches. Flow of the water into the reservoir is initiated by a float actuated switch and the duration of the flow is controlled. While the flow is occurring, a dispenser dispenses chemical into the reservoir according to a preset dispensing cycle which is initiated when the water flow is initiated and also terminates therewith.

2 Claims, 4 Drawing Figures

WATER/CHLORINE MIXTURE OUT

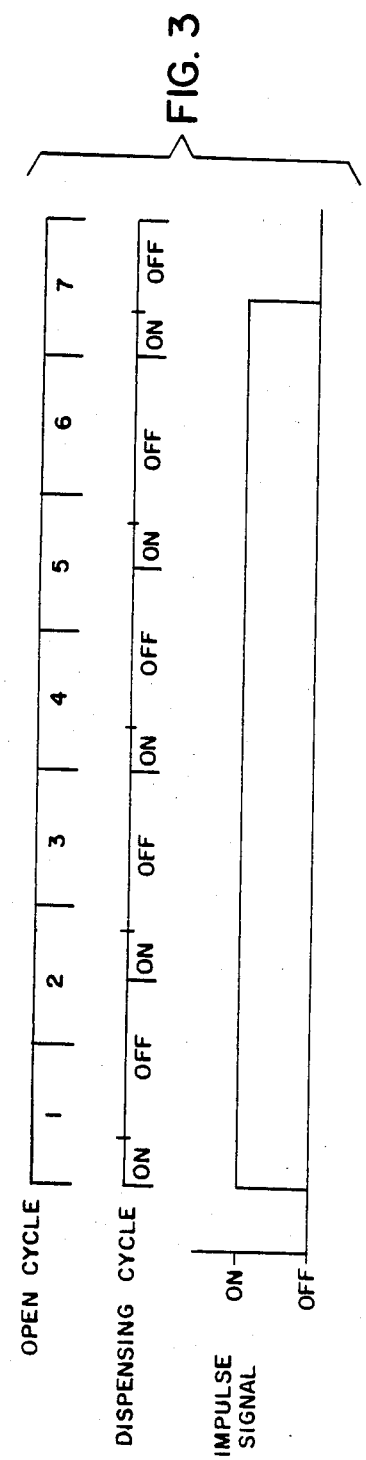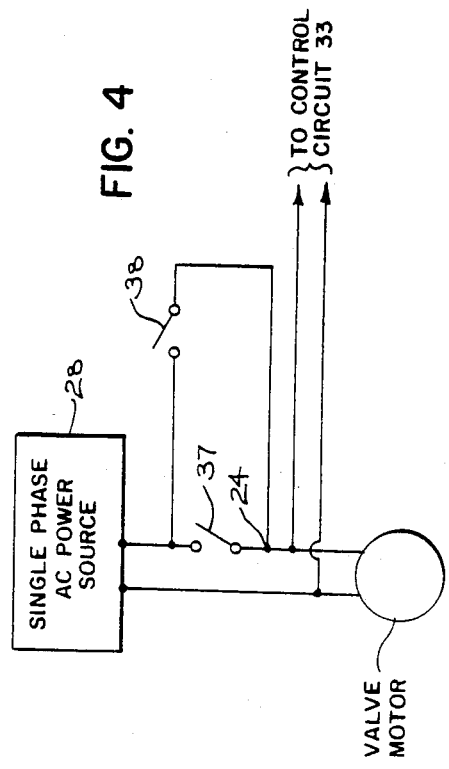

BACTERICIDAL MIXTURE CONTROL SYSTEM HAVING FLOW AND DISPENSE DURATION CONTROLS FOR RESPECTIVE SUBSTANCES

BACKGROUND OF THE INVENTION

This invention relates to bactericidal mixture control systems and in particular to such a system for coordinating the dispensing of liquid and bactericidal chemical pellets in a proper proportion.

Roof top water reservoirs are sometimes used to provide a desired water pressure as water is dispensed from the reservoir. The contents of the reservoirs must be open to the atmosphere to avoid creating a vacuum in the reservoir. Since they are open to the atmosphere, the water in them is susceptible to bacteria and algae growth so that a bactericidal chemical such as chlorine must be added to the water. It is important that the chemical be added to the water in the proper proportion to inhibit bacteria growth but maintain the water suitable for its intended purpose.

Prior art devices for controlling the concentration of chemicals in such mixtures have typically used flow measuring devices to measure the volume of water admitted to the reservoir. The appropriate quantity of chemical would then be added to the water, based on the measured volume of water. However, the flow measuring devices were expensive, trouble prone and not suitable for measuring relatively small flow rates.

SUMMARY OF THE INVENTION

The invention provides a mixture control system in which two substances are mixed together in a reservoir. A valve is adapted to admit one of the substances into the reservoir and means are provided for triggering the valve to open to admit the one of the substances into the reservoir. Means are also provided for presetting the duration of an "open" time period during which the valve remains open.

The system also includes a dispenser which is adapted to admit the other of the substances into the reservoir according to a dispense cycle. The dispense cycle has at least one "on" time period during which the dispenser dispenses and at least one "off" time period during which the dispenser does not dispense. Means are provided for presetting the durations of the "on" time period and of the "off" time period. The dispense cycle operates only during the "open" time periods.

The invention provides an economical and reliable mixture control system which can be used for a wide range of flow rates from very low to very high. Also, the system allows a wide latitude of adjustment of mixture concentrations and variable mixture concentrations as a function of demand on the reservoir. Moreover, in an especially preferred form, the system is self-resetting.

It is therefore a principal object of the invention to provide a mixture control system.

It is another object of the invention to provide such a system which is economical to provide and reliable in its operation.

It is another object of the invention to provide such a system which can be used with a wide range of flow rates into the reservoir of one of the substances to be mixed.

It is another object of the invention to provide such a system which allows a wide latitude of adjustment of mixture concentrations and which enables varying mixture concentrations as a function of demand on the reservoir.

It is another object of the invention to provide such a system which is self-resetting.

It is yet another object of the invention to provide such a system which provides mixtures on a batch basis.

These and other objects and advantages of the invention will become apparent from the following detailed description and from the drawings.

BRIEF DESCRIPTION OF THE DRAWINGS

FIG. 3 is a graphical illustration comparing a series of "open" time periods, a series of dispense cycles, and an impulse signal; and FIG. 4 is a schematic view of a portion of a control circuit for the system.

DETAILED DESCRIPTION OF THE PREFERRED EMBODIMENT

Figure 1:
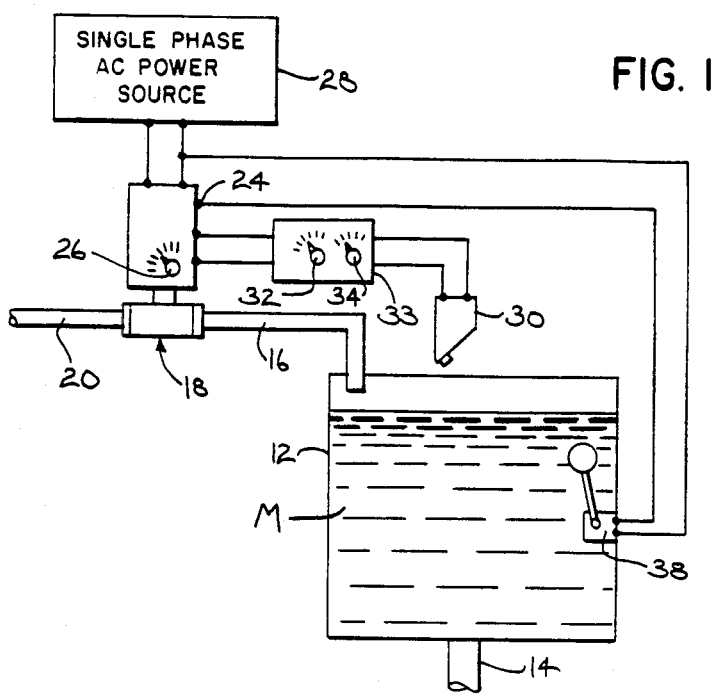
FIG. 1 is a schematic view of a mixture control system of the invention shown with the mixture at a full level.

Referring to FIG. 1, a bactericidal mixture control system of the invention is shown. A reservoir 12 contains a volume of mixture M. In the embodiment shown, the mixture M is a weak solution of chlorine in water. The mixture M is drawn from the reservoir 12 as it is needed via an outlet pipe 14.

Water is admitted into the reservoir 12 through an inlet pipe 16. The flow of water through the inlet pipe 16 and into the reservoir 12 is controlled by a valve 18. Water is provided to the valve 18 by a supply pipe 20, such as a pressurized city water supply pipe.

The valve 18 is an impulse triggered, motor operated valve. Such valves are commercially available from Autotrol Corporation, Milwaukee, Wis., under the trade designation Series 300. These valves are adaptable to open when an impulse signal is applied at a terminal 24 and hold the valve open until a preset "open" time runs out, regardless of what happens to the impulse signal after the valve is held open. The "open" time is adjustable by means of a dial 26. The valve 18 is operated by an electric motor, which requires a single phase AC power source 28. Therefore, when the "open" time is running, the valve motor is energized, and when the time runs out, power to the valve motor is cut off. However, power to the valve motor will not be cut off at the end of the "open" time period if the impulse signal is present at terminal 24. In that event, another "open" time period will be initiated without interruption in power to the motor.

Alternatively, a time control relay and a solenoid valve could be used to preset the duration of the "open" time period. The impulse signal could be used to trigger the time control relay. The time control relay would energize the solenoid valve and hold the solenoid valve open, regardless of the impulse signal, until the time expired. At that time, the time control relay would release to deenergize and close the solenoid valve to cut off the flow of water into the reservoir. However, the solenoid valve will not be de-energized at the end of the "open" time period if the impulse signal is present at the relay at that time. As above, if that happens, another "open" time period will be initiated without interruption in power to the solenoid valve.

Chlorine is dispensed into the reservoir by a dispenser 30. The dispenser 30 is adapted to admit the chlorine into the reservoir 12 according to a dispense cycle including at least one "on" time period during which the dispenser dispenses and at least one "off" time period during which the dispenser does not dispense. The chlorine as dispensed by the dispenser 30 is in pellet form (designated 31 in FIG. 2). Although it is not necessary to the invention that whatever chemical dispensed be in pellet form, pellets are convenient to handle and can be dispensed to accurately provide the desired concentration of the chemical in the mixture, as hereafter explained.

The dispenser 30 of the preferred embodiment is fully described in commonly owned, co-pending U.S. patent application Ser. No. 656,176, filed Sept. 28, 1984, entitled Bactericidal Pellet Dispenser. A timing circuit 33 for the dispenser 30 is fully described in commonly owned, co-pending U.S. patent application Ser. No. 873,880, filed June 13, 1986 which is a file wrapper continuation of application Ser. No. 655,878, filed Sept. 28, 1984, both of which are entitled Method And Circuit For Timing Chemical Dispenser Operation. The entire disclosures of both of these co-pending patent applications are hereby incorporated by reference.

Like the valve 18, the dispenser 30 is driven by an electric motor. When the dispenser motor is on, the dispenser 30 dispenses chlorine pellets. When the dispenser motor is off, no pellets are dispensed. As described in the latter co-pending patent application referred to above, the "on" time and the "off" time of the dispenser 30 are adjustable. The adjustments for the "on" time and the "off" time are schematically shown on the timing circuit 33 in FIGS. 1 and 2 as dials 32 and 34, respectively.

Rather than being connected directly to a single phase AC power source as described in the latter co-pending patent application referred to above, the control circuit 33 is connected in parallel with the motor of the valve 18. In the embodiment using a time control relay and a solenoid valve, the control circuit 33 would be connected in parallel with the solenoid valve. Therefore, the dispenser 30, and the control circuit 33, are only energized for the "open" time periods so that the dispense cycle operates only during the "open" time periods.

A float actuated switch 38 is positioned inside the reservoir 12 beneath the normal (full level) surface of the mixture M. The switch 38 switches one side of the source 28 to provide the impulse signal that triggers the valve 18 to initiate its "open" time period. When the mixture approaches the level shown in FIG. 2, the switch 38 closes to provide the impulse signal to the valve 18 to initiate the "open" time period. The impulse signal initially energizes the valve motor and the initial displacement of the valve motor closes a switch 37 (FIG. 4) which holds power from the source 28 to the valve motor. Thereafter, the valve 18 will time out its "open" time period regardless of whether the switch 38 remains closed or open, or behaves erratically. When the "open" time period runs out, the displacement of the valve motor opens the switch 37 which cuts off power from the source 28 to the valve motor. However, if the switch 38 is closed at the end of the "open" time period, the impulse signal will power the motor to initiate a new "open" time period without any interruption in power to the valve motor.

Figure 2:
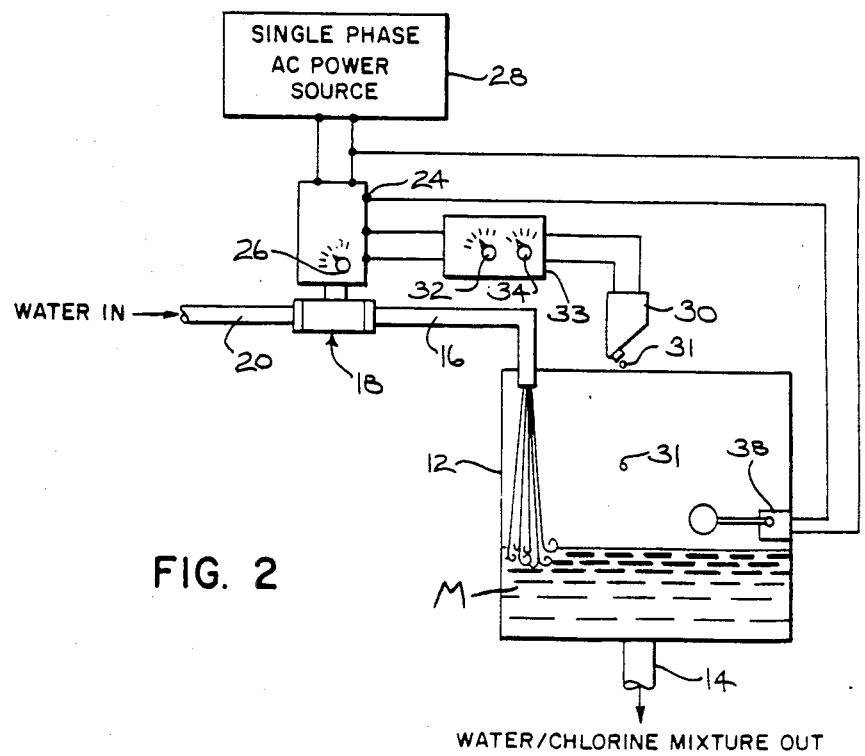
FIG. 2 is a view similar to FIG. 1, but shown with the mixture at a filling level.

In operation, the "open" time period of the valve 18 is set to admit a sufficient volume of water into the reservoir 12 to bring the level of the mixture M from that shown in FIG. 2 to the normal level shown in FIG. 1. This can be easily done since the flow rate through the valve 18 is constant, assuming a constant pressure in the supply pipe 20. Even if the supply pressure is not constant, the effects of it varying can be minimized by down sizing an orifice (not shown) in the valve 18 through which the water passes.

The "on" time of the dispenser 30 is adjusted to dispense a sufficient quantity of chlorine pellets to maintain the concentration of chlorine in the mixture M substantially constant from the level of FIG. 2 to the level of FIG. 1. Therefore, enough chlorine is added to bring the added volume of water up to about the same concentration as the residual mixture M which was remaining in the reservoir 12 before the water was added. Hence, the mixture concentration is controlled in batches, the water flowing through the valve 18 during each "open" cycle and the chlorine dispensed therein constituting one batch.

The flow rate through the valve 18 and the dispensing rate of the dispenser 30 are selected such that the "on" time of the dispenser 30 is less than the "open" time of the valve 18. In the preferred embodiment, the "off" time of the dispenser 30 is adjusted to take up the remainder of the "open" time in excess of the "on" time. That is, the "on" time plus the "off" time equals the "open" time. Therefore, in the preferred embodiment, the dispense cylce is synchronized with the "open" time period.

The reason for this is that it is possible that the valve 18 could remain open for more than one "open" time period. This would occur if a sufficient quantity of mixture was being drawn out of the reservoir during the "open" time period so that the switch 38 was closed when the "open" time period ran out. Then, as stated above, the valve 18 would begin a new "open" time period, without an interruption in power to its motor. Since the dispense cycle of the dispenser 30 is synchronized with the "open" time period, it will begin again, also uninterrupted, at the same time that the new "open" time period begins, to make another batch of mixture.

In some applications, it may be desirable to adjust the dispensing cycle so that it is not synchronized with the "open" time period. For example, in applications where there are periodic high volume demands made on the reservoir, it may be desirable to have the concentration of chlorine in the mixture decrease for repeated successive batches. This may be desirable because for such applications there may not be sufficient residual mixture left in the reservoir before adding a new batch to help average out the concentration of chlorine in the mixture after the new batch is added. This could be accomplished by adjusting the "off" time so that the dispensing cycle was longer than the "on" time period, as graphically illustrated in FIG. 3. It is shown that during "open" time period 1, a full "on" time occurs so that the full concentration is maintained for that batch and for the resulting residual mixture. The same is true for "open" time period 2, although the "on" time beings later into the "open" time period. However, no "on" time overlaps with "open" time period 3, and therefore no chlorine pellets will be dispensed into that batch. With the selection of "on", "off" and "open" time periods shown, if the high volume demand cqntinues, the cycles repeat, with cycles 4, 5 and 6 corresponding to cycles 1, 2 and 3, respectively.

An on-off graph showing an impulse signal which could have caused the series of "open" time periods and dispensing cycles in FIG. 3 is also shown in FIG. 3. Of course, other impulse signals also could have caused this operation. It should be noted that the dispense cycle occurring during "open" time period 7 stopped when "open" time period 7 stopped and that this occurred prior to the end of the "off" time. This is because when "open" time period 7 ended, all power was cut off from the control circuit 33 and from the dispenser 30.

A power interruption to the control circuit 33, such as that which occurred at the end of "open" time period 7 in FIG. 3, causes the control circuit 33 to be reset. Therefore, when the dispenser 30 is energized again, it will be brought back in phase with the "open" time period, at least at the beginning of it, so that it will begin at the start of a new dispense cycle when the "open" time period beings. Note that this is advantageous since, by the time of a new "open" time period, demand may be normal so that decreased concentrations are not desirable.

FIG. 3 only illustrates one possible way of adjusting the open and dispensing cycles apart from synchronizing them. There are an infinite number of other ways. For example, it may be desirable to have more than one "on" time period per "open" time period. This would help keep the concentration of the mixture more constant as a batch was being admitted into the reservoir. It may also provide more statistically accurate operation of the dispenser 30. In such a case, it may be desired that the sum of all the "on" cycles occurring during one "open" cycle dispense enough pellets to yield a desired batch concentration. It is also possible to stagger the dispensing cycles in a manner similar to that shown in FIG. 3, by adjusting the "off" times.

Numerous modifications and variations to the preferred embodiment will be apparent to those of ordinary skill in the art but which will still be within the spirit and scope of the invention. Therefore, it is not intended that the invention be limited by the scope of the description or drawings, but only by the claims which follow.

We claim:

1. A bactericidal mixture control system in which water and a bactericide are mixed together in a reservoir, comprising:
   a valve adapted to admit the water into the reservoir;
   means for triggering the valve to open to admit the water into the reservoir;
   means for presetting the duration of an "open" time period during which the valve remains open independent of the triggering means;
   a dispenser adapted to admit the bactericide into the reservoir according to a dispense cycle including at least one "on" time period during which the dispenser dispenses and at least one "off" time period during which the dispenser does not dispense;
   means separate from said open time period presetting means for presetting the duration of the "on" time period; and
   means for presetting the duration of the "off" time period;
   wherein the means for triggering the valve to open is responsive to the level of liquid in the reservoir to initiate the running of the "open" time period.

2. A mixture control system in which two substances are mixed together in a reservoir, comprising:
   a valve adapted to admit one of the substances into the reservoir;
   means for triggering the valve to open to admit said one of the substances into the reservoir;
   means for presetting the duration of an "open" time period during which the valve remains open;
   a dispenser adapted to admit the other of the substances into the reservoir according to a dispense cycle including at least one "on" time period during which the dispenser dispenses and at least one "off" time period during which the dispenser does not dispense;
   means separate from said open time period presetting means for presetting the duration of the "on" time period;
   means for presetting the duration of the "off" time period;
   means for permitting operation of the dispense cycle only during the "open" time periods; and
   wherein the means for triggering the valve to open comprises a float actuated switch which provides an impulse signal to initiate the running of the "open" time period.

* * * * *